INVENTORS
Ernst SCHWAMM
Johann Jost REEH

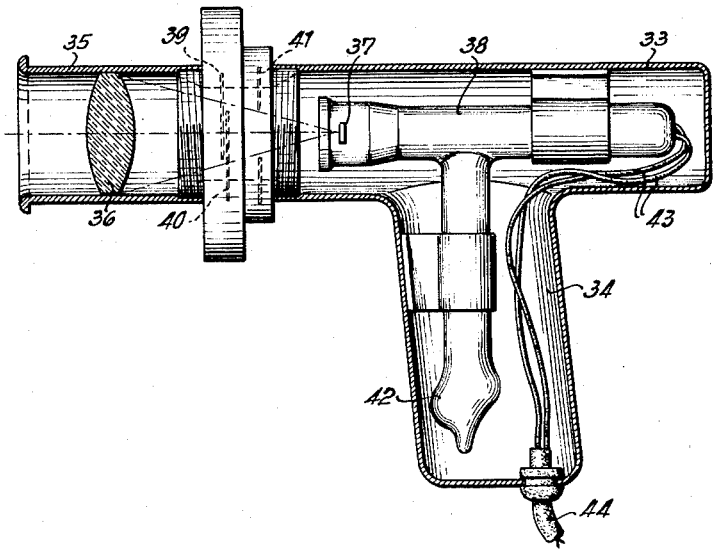
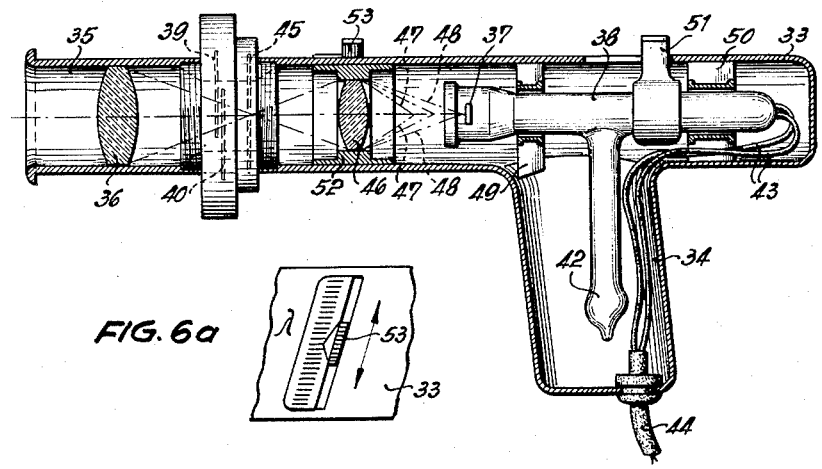

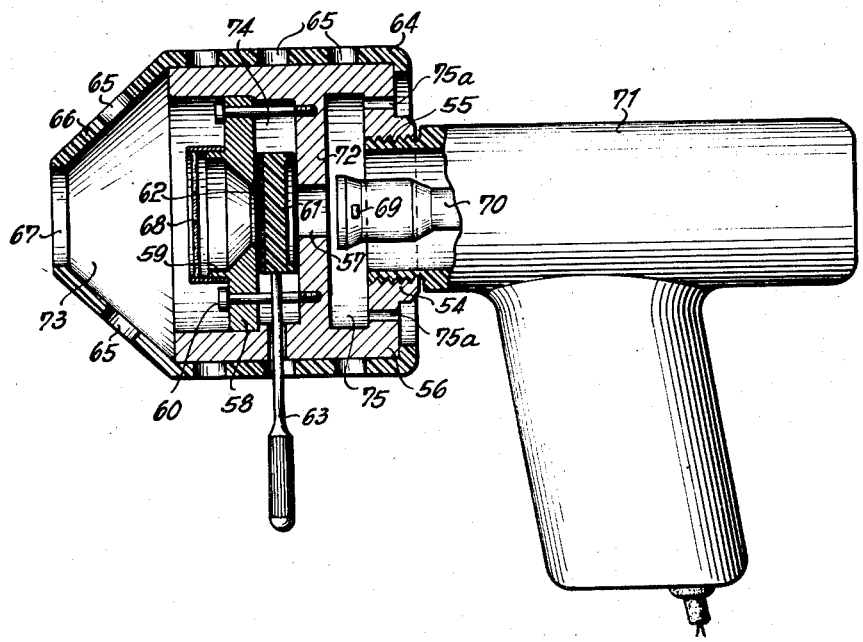

Aug. 27, 1957     E. SCHWAMM ET AL     2,804,069
APPARATUS FOR MEDICAL DIAGNOSES
Filed June 15, 1954     5 Sheets-Sheet 5
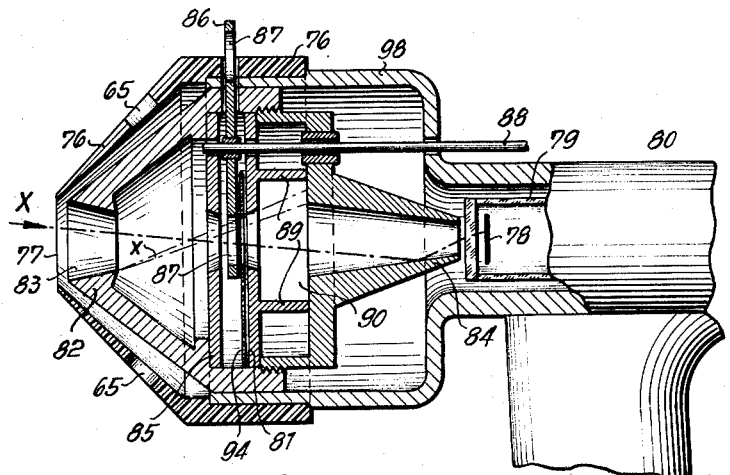
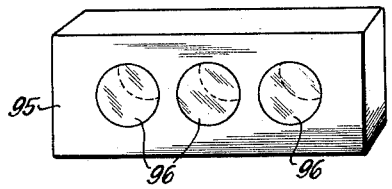
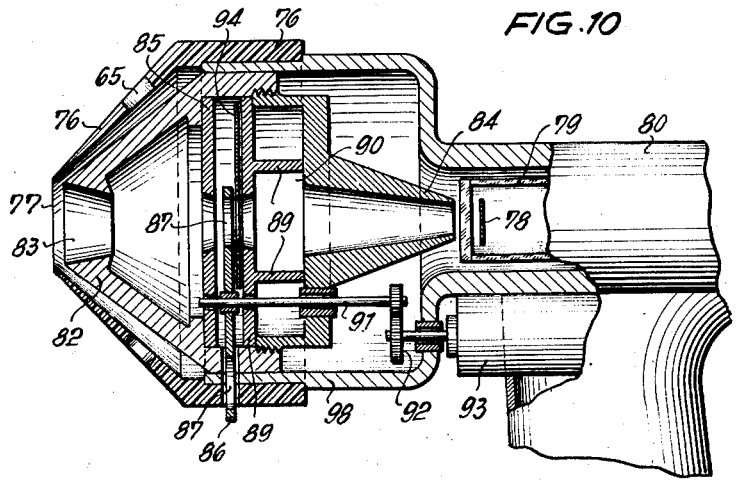
INVENTORS
Ernst SCHWAMM
Johann Jost REEH
BY:

United States Patent Office 2,804,069
Patented Aug. 27, 1957

2,804,069
APPARATUS FOR MEDICAL DIAGNOSES

Ernst Schwamm, Obernhof (Lahn), and Johann Jost Reeh, Bad Ems, Germany

Application June 15, 1954, Serial No. 436,876

Claims priority, application Germany July 3, 1953

6 Claims. (Cl. 128—2)

The present invention relates to a new method and apparatus for carrying out medical diagnoses.

Generally speaking, physicians have previously understood the temperature of the human body to be its heat when registered by means of a thermometer, and any increase or change in temperature was regarded merely as a general reaction of the body to illness which remained to be diagnosed by other symptoms. In its later development measurements of the degree of temperature of the different parts of the body indicated to the physician where the seat of the illness might be. However, in view of modern research such temperature variations can no longer be regarded as sufficient for diagnostic purposes.

It is a well-known fact that through central control centers, one of the purposes of the epidermis is to regulate the temperature gradiant between the body and its surrounding atmosphere, in which process the largest percentage of the heat dissipated by the body is radiated therefrom, while the remainder is passed off by convection. Also known for therapeutic purposes is the permeability of the human epidermis and the penetrating effect of infra-red rays thereon.

The present invention is based upon the new cognizance of the fact that the individual tissue particles of the epidermis controlled by its circulatory system and acting as a vegetative cover or shell emits an infra-red radiation of a particular variety. The new conclusions drawn are also based upon the fact that the maximum radiant energy of the sun lies at 0.48 $\mu$ (green light) and that the human eye possesses its highest sensitivity within approximately this same wave length. Thus, the sensitivity of the eye is related to the intensity of radiation of the sun in accordance with the wave length thereof, a law of nature which has already been investigated thoroughly. If in the application of this law the human being is regarded as a radiant body having a temperature of 37° C., the radiant energy emitted by the human body would then lie at a maximum of 8 to 10 $\mu$.

Recognized laws concerning the radiation of the sun show that $H_2O$, $CO_2$, and $O_3$ possess so-called absorption bands which prevent the existence on the earth surface of a continuous thermal spectrum. It is a further well-recognized fact that the radiation of the sun passing to the earth surface through the atmospheric cover includes an infrared band which lies within the range of 7 to 14 $\mu$. If such solar window were to be plotted as a function of the intensity in relation to the wave length, a kind of bell-shaped curve would be obtained, the peak of which would lie between 8 and 9 $\mu$. If climatic changes occur, especially the range between 9.4 and 10 $\mu$ ($O_3$ absorption), i. e. the peak of this bell-shaped curve would be considerably suppressed. This must be based upon a law of nature, particularly since the human body has a temperature of 37° C. and thus possesses a peak of radiation corresponding to the infrared window of the sun. Thus the human body is always exposed to a long-wave infrared radiation which varies continuously and, seen purely from a physical standpoint, is directly dependent upon weather conditions.

From this the result may be drawn that every human being radiates an electromagnetic wave produced by the molecular motion, which does not possess any definite wave length but represents a mixture of wave lengths within the range of approximately 7 to 20 $\mu$, or, in other words, a certain spectrum. It may therefore be assumed that any unusual or abnormal reactions of the human body will be reflected within such spectrum. Thus, if it were possible to differentiate this spectrum by accurate measurements it should then be possible to obtain an indication of subsequent abnormal organic process and at a time when present day X-ray and electro-pathological diagnoses must still deny the existence of any abnormal physical process. The reason for this is that the infrared radiation of the human body is apparently equivalent with the primary, supporting system of the entire body household.

By extensive research and experimentation it has now been determined that the natural or characteristic field of the infrared radiation of the human body is subject to a continuous change. Further it has been found that thermal irritations produce variations in the action currents, i. e. the electric currents on the body surface which may be measured and possess values in microamperes. This leads to the reasonable conclusion that a portion of the ganglia act as extremely sensitive thermocouples and thus possess the quality of converting infrared rays into electricity.

Cognizance of the above-related findings leads to the following conclusions:

1. The energy emanating from the human body in the form of electromagnetic infrared radiation may be determined by measurement.

2. Any irritation, even the least, is capable of varying such energy which may thus be regarded as a general characteristic, and such variation can be determined by measurement.

3. Any illness shows a field distortion so that if measurable, such field distortion will indicate the particular location of the illness and hence assures an accurate neural-pathological diagnosis of the center of irritation.

4. Arbitrary variations of infrared radiation may be observed even within fractions of a second, depending upon the concentration of internal or external irritations.

Thus the conclusion may be drawn from the newly recognized facts as mentioned above that a diagnosis no longer has to rely solely upon cellular pathology in the sense of merely observing and ascertaining the existing condition of the cells, but now even the tendency toward a change of condition of the cells, i. e. the energetic reactivity of the cellular system, can be measured.

Diagnostic apparatus have recently been developed which seemingly carry out similar measurements whereby the skin and tissue may be electrically observed and for which a thermo-electric detector with a counterelement is used, such detector generally consisting of a metal plate which is placed in direct contact with the skin. Although apparatus of this type permit a so-called "early" diagnosis, actually it is no more than an improvement or refinement of the customary diagnosis of observing the cellular condition, inasmuch as no more is being measured than the body temperature, even though with technical means which have been improved considerably.

In contradistinction with these prior methods, it is the object of the present invention based upon the findings as previously mentioned to measure the infrared radiation of the organism rather than the temperature thereof. Although the objection may be raised that heat and infrared radiation are merely different expressions for the identical object, this is true only physiologically, whereas physically there is a considerable difference inasmuch as the heat radiation comprises the entire infrared spectrum from 0.76 $\mu$ to several hundred $\mu$, for practical purposes to about 400 $\mu$, at which limit the infrared rays lose their energy and they are then spoken of as centimeter waves.

According to the present invention the sum of all infrared rays of the body, i. e. the temperature, is no longer being measured, but the infrared radiation within individual, very specific frequency ranges. Such selection of definite frequency ranges permits a curve to be plotted which represents the distribution of the intensity of the infrared rays depending upon the frequencies, whereas a measurement of the temperature of the same place of the body might indicate a perfectly normal value.

These, as well as further objects, features, and advantages of the present invention will be described in detail in the following description thereof with reference to the accompanying drawings, in which:

Figs. 2 to 4 are diagrammatic illustrations of several embodiments of the invention; while Figs. 5 to 10 illustrate various details of design of a measuring instrument according to the invention.

Figure 1:
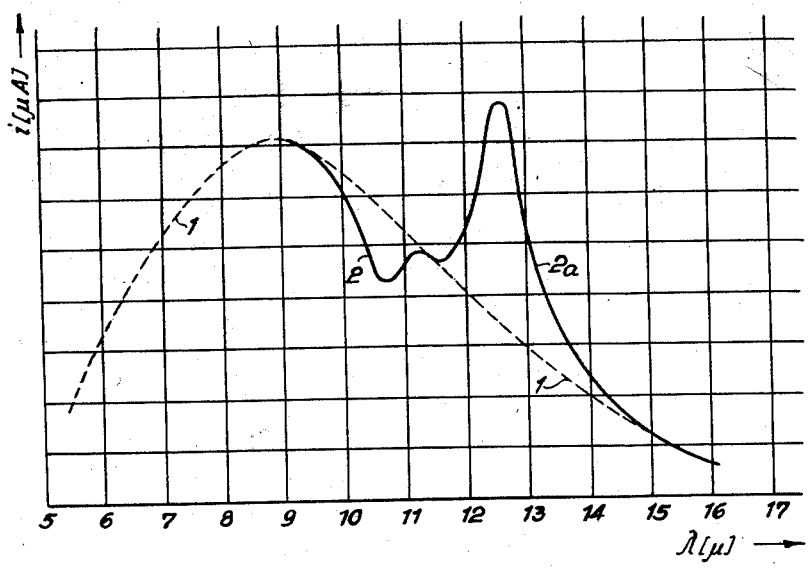
Fig. 1 shows diagrammatically an example of the result of a measurement carried out in accordance with the invention.

Referring to Fig. 1 of the drawings, the graph illustrated shows a result of a measurement on the human body at the place of the liver. From a healthy liver the trajectory of the rays extends approximately as indicated by the curve 1 shown in dotted lines, the wave length $\lambda$ being plotted in $\mu$ along the horizontal axis, while the intensity is plotted along the vertical axis at an arbitrary scale, for example, in accordance with the scale divisions of a micrometer. Abnormal changes of the liver, however, produce aberrations either upwardly or downwardly from the dotted curve, depending upon the type of the abnormality or disease, as illustrated, for example, by the curves 2 and 2a shown in solid lines. Actually, as many tests followed by clinical findings have proven conclusively, the position of these aberrations along the wave length scale as well as the intensity permit definite conclusions to be drawn as to the existence and the type of the incipient abnormal change of the respective organ of the body. This example already indicates that this invention furnishes the physician with an entirely new possibility of making a diagnosis objectively and accurately.

In actual practice, the new method is carried out by measuring the infrared rays of a certain, exactly defined place of the body by means of instruments which are responsive to infrared rays and the electrical properties of which change in accordance with the intensity. Various apparatus already in existence may be utilized for such measurement, such as thermocouples, bolometers, infrared supericonoscopes, etc., which, according to the invention are mounted in a casing of a particular design. For selectively limiting the measuring range at the place to be measured to arbitrarily chosen wave bands, the invention provides the use of suitable ancillary filters placed in front of the measuring instrument, or of a spectrograph, all of which are known as such. The variations of the electrical properties of the measuring instrument are then visibly indicated by means of suitable circuits and amplifiers. According to a preferred embodiment of the invention, the angle within which the infrared radiation of the body is to be measured may be controlled by means of an adjustable diaphragm, and to collect the rays inciding within such angle in a manner known as such by means of two concave reflectors and to focus them upon that part of the measuring instrument which is responsive to infrared rays.

Another object of the invention is to design a convenient instrument which any physician will be able to handle and operate to carry out the method previously described. For this purpose, all required parts, that is, the radiation-responsive measuring element with adjustable diaphragm and ray collectors and the necessary electrical control elements and the selective auxiliary apparatus and, if desired, even the required source of current are all enclosed within a single casing which may easily be placed upon any place of the human body.

Figure 2:
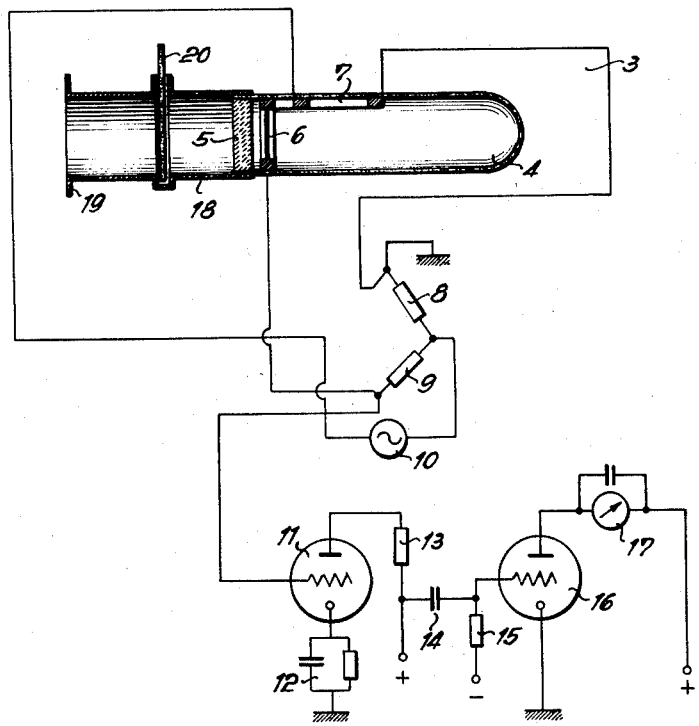

Fig. 2 diagrammatically illustrates a radiometer 3, for example, a bolometer or thermocouple of a kind known as such and consisting of a glass bulb 4 which has been evacuated to about .01 Torr. and is closed at the front by a plate 5 which should be permeable within the largest possible range of the infrared region, for example, within the wave band of 1 to 250 $\mu$ or higher and for this purpose preferably consists, e. g. of quartz.

The bulb 4 contains an ohmic resistance consisting of a coating of bismuth which is deposited by evaporation upon thin film 6 of zapon varnish. This resistance is located immediately behind the quartz window 5 and therefore struck by the infrared radiation entering through such window, while a second resistance 7 which likewise consists of a coating of bismuth deposited by evaporation upon a film of zapon varnish is placed so as not to be struck by the entering radiation. These two resistances 6 and 7 are connected with two further ohmic resistances 8 and 9 so as to form a conventional bridge circuit which at two points of intersection of diagonals are connected to a source of alternating current 10 of, for example, 500 periods per second. One of the two other points of intersection of diagonals of the bridge is grounded, while the other is connected to the control grid of an amplifier tube 11 illustrated as a triode. The cathode lead of the tube 11 contains a rheostat-condenser unit 12 for producing the negative grid potential, while the anode lead contains a resistance 13 which, through a coupling member 14, 15, is connected to the grid of an amplifying detector 16, the anode circuit of which contains a microammeter 17. The cathode of tube 16 is grounded, whereas the lower end of the resistance 15 is connected to a negative grid potential.

The bulb 4 of the radiometer 3 has fitted thereon a tube 18 which serves a double purpose, namely, of spacing the radiometer a predetermined distance from the surface of the body when placed thereon for examination, for which a flanged portion 19 is provided on the outer end of tube 18. The second purpose of the tube 18 is to permit the radiation of only a restricted part of the body, that is, one of a size corresponding to the diameter of the tube 18, to fall on the bolometer 3. Finally, an ancillary filter 20 may also be inserted into the tube 18 which only allows infrared rays, i. e. those from the visible red light of 0.78 $\mu$ to about 40 to 60 $\mu$, to pass therethrough. Such filters may, for example, consist of a potassium bromide monocrystal, and are commercially obtainable. At a thickness of 10 mm. they are equally permeable for all wave lengths up to about 22 $\mu$, whereas above 22 $\mu$ and up to 40 $\mu$ their permeability or transparency gradually decreases down to zero. At a thickness of the crystal of 1 mm., the permeability remains the same up to about 30 $\mu$ and at a thickness of 0.1 mm. up to about 40 $\mu$. The permeability at these crystal thicknesses then decreases down to zero between 30 and 50 $\mu$, or 40 and 55 $\mu$, respectively. Another suitable filter which remains permeable up to approximately 45 $\mu$ is formed of a mixed crystal which is internationally identified by the designation "KRS 5" and consists of 44% thallium bromide and 56% thallium iodide.

A diagnostic apparatus of the novel type described may be applied for determining changes of the respective portion of the body from the normal, healthy condition by placing the flange 19 of the bolometer 3 upon the respective body portion to be examined and measuring the infrared radiation within a larger wave band by inserting different filters 20.

Figure 3:
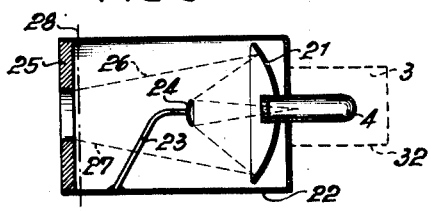

The sensitivity of the diagnostic apparatus according to the invention may be further increased in the manner as illustrated in Fig. 3, by mounting a ray-collecting or concentrating device in front of the bolometer 3. Such device may, for example, consist of a concave reflector 21 of a larger diameter and provided with a central opening in which the bolometer 3 is inserted. Further, a second reflector 24 of a smaller diameter than reflector 21 is mounted in front of the bolometer 3 by suitable means, such as, for example, a rod 23 secured to the wall 22 of a housing, the infrared radiation entering at the front of the housing through the opening of a diaphragm 25 thus being focused upon the bolometer 3, as indicated by the dotted lines 26 and 27.

For selecting certain wave bands by means of the unit shown in Fig. 3 so as to obtain a course of a curve as illustrated, for example, in Fig. 1, filter disks of different transparency may, one after the other, be inserted behind the diaphragm 25, which may be adjustable such as, for example, an iris diaphragm, that is, at the point indicated by the dot-and-dash line 28. Such selection may, however, also be carried out by successively exchanging the bolometer 3 shown in Fig. 3 for one or another of a series of other bolometers, the closing filter 5 of each of which may be given a certain range of transparency.

The dotted line 32 indicates a supplementary housing attached to the housing 22. The bridge circuit and sources of current may be similar to those shown in Fig. 2 and therefore are not again illustrated in Fig. 3.

Figure 4:
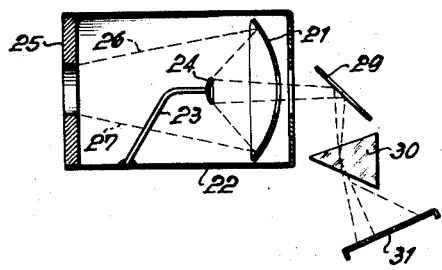

The embodiment of the invention shown in Fig. 4 likewise contains a ray-collecting device similar to that shown in Fig. 3 and diagrammatically illustrates the manner in which the spectrum of the infrared radiation may be so considerably resolved as to separate the infrared rays extensively from each other. For this purpose not only the elements described with reference to Fig. 3, but also a deflecting mirror 29 may be provided which deflects the beam of rays upon a quartz prism 30 behind which, approximately within a plane 31, the entire infrared spectrum appears, so that this spectrum may be scanned by means of a small slit diaphragm which may be moved along a plane 31, and behind which a radiation-responsive element be provided. Thus, in the apparatus as shown in Fig. 4, a selection of certain spectral ranges by means of filters is thus no longer required.

In order to mount the elements as previously described so as to form a unit which can be easily manipulated, the casing thereof is preferably made of pistol-shape, the open muzzle of which may receive a suitable slip on wave-length selection filter similar to a camera. The barrel-like part of the casing contains the condenser lens, the diaphragm, and the tubular part of the thermocouple including the soldered point and thermocouple wires, while the part of the thermocouple containing the getter and the fused part of the thermocouple extend into the grip of such pistol-like casing.

Experiments have shown that for different types of measurements it is advisable to limit each measurement to a certain length of time. For this reason between the condenser lens and the adjustable diaphragm an adjustable central shutter or a slit-type shutter as used in photographic cameras should be provided, with the only difference therefrom being that for the infrared radiometer the shutter-opening times must be slightly longer, which may be provided without any technical difficulties. However, the selection of the different wave length by attaching different filters is rather complicated since for this purpose the instrument must be taken off the body for exchanging the filters which obviously occupies both hands.

The present invention therefore provides a possibility of facilitating this procedure considerably. For this purpose, a second condenser lens which has a chromatic aberration for different wave lengths is inserted in the path of the rays entering the instrument. The chromatic aberration of such lenses, which are known as such, is produced by exterior grinding. They have the characteristic to diffract rays of various wave lengths at a different angle. Thus, if a ray mixture falls upon the lens, the focal points of the individual rays will not coincide within one focal plane but each wave length will have a different focal point. All these focal points lie on the optical axis of the lens and therefore form a focal line. This characteristic is utilized according to the invention by arranging the second condenser lens or the thermocouple, or both, so as to be shiftable in axial direction relative to each other by suitable levers or other actuating mechanism. Thus it is possible to adjust the focal point of a certain wave length at any time so as to coincide precisely with the soldered point of the thermocouple, and hence to measure one definite wave length only. For practical purposes it is advisable to mark the respective position of the condenser lens or the soldered points of the the thermocouple upon a scale calibrated in λ so that the instrument may be adjusted in as simple a manner as possible to a definite wave length.

The lenses suitable for infrared rays usually consist of rock salt, potassium chloride, or a mixed crystal known internationally by the designation "KRS 5." Such lenses are very hygroscopic and, in order to protect them from moisture, they are preferably provided with a protective coating consisting, for example, of the respective fluoride, selenium, or a suitable metallic oxide, such as indium oxide.

For increasing the working life of the instrument, it is advisable to enclose the entire unit in an airtight casing and to provide a window which permits infrared rays to enter at the front thereof. Such casing is preferably again made in the shape of a pistol, as shown in Figs. 5 and 6, wherein the casing 33, consisting of a tubular part, has an extension 34 serving as a grip. The muzzle 35 of the tubular part is adapted to have slipped thereon the various filters in the same manner as a photographic camera. The muzzle element 35 contains a lens 36 behind which an automatic central or slit-type shutter 39 and 40 should be provided. The rays inciding through the lens 36 and the shutter 39, 40 are restricted by a diaphragm 41 with an adjustable aperture. The rear part of the casing 33 has fixedly mounted therein a thermocouple 38 at a position where the focal point of the lens 36 accurately coincides with the soldered point 37 of the thermocouple 38. Part 42 of the thermocouple containing the getter and the fused end thereof extends into the grip 34 of the instrument which also contains the lead-in wires 43 connected to a cable 44. For a clearer view of the most essential elements of the instrument, the necessary electric switches and the time shutter release are omitted from the drawing. They may suitably be provided in a form of a trigger on the pistol-like grip.

The modification of the invention shown in Fig. 6 differs primarily from that shown in Fig. 5 by the provision of a second condenser lens 46 between the adjustable diaphragm 45 and the thermocouple 38. This lens 46 is mounted in a slide 52 which by means of a lever 53 may be shifted in axial direction by a crank type drive as illustrated in Fig. 6a. The rays inciding on the lens 46 from a focal line coinciding with the optical axis thereof. The rays having the closest focal point are indicated by the numeral 47 and those with the most remote focal point by the numeral 48. As illustrated in the drawing, the lens 46 may thus be shifted to place the focal point of the individual rays 47 to 48 so as to coincide precisely with the soldered point 37 of the thermocouple 38. Obviously, the lens 46 may just as well be stationary mounted and, to provide for the relative adjustability, the thermocouple may be shifted in axial direction within the bearing elements 49 and 50 by means of a drive 51 similar as described relative to lens 46. It is also possible to make both the lens and the thermocouple adjustable, for example, by using one for a coarse adjustment and the other for precision adjustment.

In the event that the length of the focal line of such a lens is not sufficient for a precise adjustment, it is easily possible to draw the individual rays further apart from each other by another lens of the same type. In the embodiment of the invention shown in Fig. 6, the control levers 51 and 53 are located on the upper side of the instrument. For practical use, however, it is preferable to mount them on the left side so that they can be adjusted by the thumb, while the other switches, as described relative to Fig. 5, may be operated by the index finger.

Obviously, this type of selective ray measurement either with individual ancillary filters or with lenses of chromatic aberration cannot claim to be so accurate as to permit the individual wave lengths to be determined down to one μ. This, however, is not the purpose of the instruments previously described but it is the object of the invention to design an instrument which enables a physician in his own practice to determine in a simple and practical manner which wave band of the infrared spectrum might contain a maximum or minimum of intensity. Many tests carried out with this instrument have shown that this can be done at an accuracy of about 2 to 3 μ.

Actual practice with these instruments has shown that, although working with sufficient accuracy, the measuring range will shift if a series of measurements are carried out extending a greater length of time. Thus, it was found that such shifting of the measuring range is caused by the fact that the radiant heat of the body to be measured as well as other outside thermal influences gradually produce a temperature increase of the measuring instrument.

In order to avoid this disadvantage, the present invention further provides a heat accumulator which is placed upon the ray-receiving opening of the instrument and consists of a material of high thermal conductivity and is of relatively large bulk. A suitable material for this purpose is, for example, aluminum or an aluminum alloy which, aside from its high thermal conductivity, has a low specific weight so as not to increase the weight of the entire instrument unduly and still permit it to be manipulated without any strain upon the operator.

According to the invention, such heat accumulator consists of a tubular part provided with three flanges forming two cavities or chambers, the head of the thermocouple projecting into the outer chamber, while the other chamber has pivotably mounted therein a gate for closing the apertures provided in the flanges. For restricting the heat as much as possible from the flange of the heat accumulator facing the thermocouple, this gate preferably consists of heat-insulating material, such as rubber and is in contact with the flange facing the thermocouple only through a narrow annular surface. The front side of the gate is preferably provided with a thin, ground and polished metal disk which is adapted to reflect a part of the radiation. This metal disk is in intimate contact with the front flange of the heat accumulator by means of a wide annular surface so as to conduct the heat collected thereby to such flange. The entire body of the accumulator is enclosed by a protective casing of highly heat-insulating material which, on the one hand, is designed to prevent a direct heat transfer from the hand to the accumulator if the latter should accidentally be touched, while, on the other hand, this casing is shaped so as to maintain the heat accumulator and hence the entire instrument at a certain distance from the point of the body which is to be measured. The pistol-shaped casing as such is preferably likewise made of a highly heat-insulating material such as rubber or an equivalent synthetic material. Further, for passing off the accumulated heat, the protective cover is provided with numerous vents which communicate with the outer air. Also, the space around the heat accumulator and surrounding the head of the thermocouple communicates with the outer air through suitable vents.

An embodiment of the invention as above described is illustrated in Fig. 7. The thermocouple 70 is mounted in the same manner as shown in Figs. 5 and 6 within a pistol-like casing 71 consisting of a thick enclosing wall of hard rubber or the like. The casing 71 is provided at its forward end with screw threads 55 and screwed into the flange 54 of the tubular heat accumulator 56 of thick-walled aluminum. This tubular body 56 has a flange 72 integral therewith having a central aperture 57. Another flange is formed by a disk 58 which is likewise provided with a central aperture and rests upon shoulders of the tubular body 56 to which it is bolted by screws 60. The two flanges 58 and 72 form three chambers 73, 74, and 75 in the tubular body 56. Pivotally mounted in the chamber 74 is the gate 61 consisting of a highly heat-resisting material, such as rubber or the like. Gate 61 is in contact with flange 72 only by an annular surface and carries on its front side a ground and polished metal disk 62 which is in intimate heat-conductive contact with the disk 58 by a wide annular surface. The disk 58 has a forwardly projecting annular flange 59 upon which one or another of the required filters 68 may be slipped. The tubular part 56 of the heat-accumulating element is enclosed by a protective casing 64 which also consists of a highly heat-insulating material. The rear part of the casing 64 embraces the annular body 56 by a flange 64a, and for this purpose is made of elastic material, such as soft rubber, while the forward part 66 which encloses the antechamber 73 preferably consists of a hard heat-insulating material, such as hard rubber or a molded plastic. The protective casing 64, 66 is provided along its entire periphery with numerous apertures or vents 65 through which the accumulated heat may escape.

The operation of the instrument as shown in Fig. 7 is as follows:

The instrument 71 is placed with the front opening 67 of the outer protective casing upon the particular place of the human body to be measured. Then, for actually measuring, the handle 63 is turned to open the gate 61 and thus to admit the infrared rays to pass for a certain length of time through the apertures of the flanges 58 and 72 to the soldered point 69 of the thermocouple 70. Already during such measurement a part of the rays entering through the opening 67 hit upon parts of the instrument outside of the measuring apertures, while when the gate is closed, all rays incide upon the head of the instrument. If a longer series of measurements are being carried out, these rays develop a temperature which according to the invention is absorbed to the largest extent by the tubular element 56 and the three thick flanges thereof. The chamber 75 surrounding the head of the thermocouple is being ventilated by vents 75a. The heat-accumulating element is designed so as to receive and retain the heat of radiation as much as possible within its forward part which has the greater bulk. For this purpose, the gate, as previously described, is also designed so as to transmit the heat of radiation absorbed by it to the forward flange. The arrangement of a lens system within the measuring instrument is omitted in Fig. 7 for the sake of clarity, the operation and effect of the heat-accumulating head obviously being identical in instruments with lens systems as shown for example in Fig. 6. By designing the instrument as illustrated in Fig. 7, the heat of radiation occurring in the course of a longer series of measurements will be accumulated without influencing the thermocouple in any manner. Many practical tests with the instrument have shown that the accumulated heat will no longer affect the thermocouple so as to cause a shifting of the measuring range, even though the instrument might be in use for a greater length of time.

It should also be pointed out that in instruments designed for use in hospitals or research institutes which need them for continuous measurements for long periods of time, the accumulator head according to the invention may be provided, or connected with a special cooling system whereby a circulating coolant will maintain a constant temperature, if necessary, by cooperation with thermostatic means. Such cooling means being known as such and the application of which being obvious to anybody familiar with the art, they are not being shown in the drawing for the sake of a clearer understanding of the invention as such.

Many further experiments and tests with the new instruments as previously described have also shown that they may be easily and properly used by an experienced person thoroughly familiar with measuring instruments and the manner of operating them, since such person is able to distinguish between true and false indications, for example, if the zero point should deviate or sudden outside influences should affect the instrument. As it is, however, one of the principal objects of the invention to design an instrument which will remain absolutely reliable under any circumstance, and can be easily used by any practicing physician without any technical knowledge in an average medical practice, still another modification of the invention, as shown in Figs. 8 and 9, has been provided, the principal difference of which from the embodiments previously described consists in modulating the radiation to be measured in a manner which is known as such and in providing novel means for carrying out such modulation.

For this purpose, the foremost part of the head of the instrument, that is, in front of the means for selecting the respective wave lengths, has rotatably mounted therein an apertured disk which is adapted to rotate at a speed which may be precisely predetermined. The frequency to be chosen may be the international one of about 12.6 cycles per second, although any other frequency may be used depending upon a suitable design, such as the diameter of the apertured disk and the number of apertures therein, as well as suitable synchronized or constant-speed motors.

Although it may be safely assumed that the infrared radiation of the living organism possesses an inherent frequency which corresponds to the rhythem of the vascular supply so that such frequency might be utilized directly without a modulation of the rays, and only this frequency might then be amplified in the amplifier, such extremely low frequency which is less than one cycle per second causes considerable difficulties in amplifying, and especially it is by far not as regular as to be regarded as a constant frequency. For this reason, the present invention provides a separate ray modulation, especially since actual tests have shown that surging as a result of double frequency does not occur. The apertured disk mounted in the front part of the head of the instrument may be driven by a flexible shaft, in which case the driving motor may be located at any suitable place, for example, behind the temperature-responsive element or within the amplifier housing. For use in connection with such a ray modulation, a large surface bolometer will be especially suitable. For reducing the length of time of the measurement as much as possible, it is advisable to insert a plurality of the required infrared filters into a common frame which can be passed easily and quickly through the instrument either by rotating or drawing the frame containing the individual filters past the ray opening. The frame may also be moved intermittently by simple automatic means, for example, by turning the filter disk by means of a spring and arresting each filter in front of the ray opening by a suitable stop or ratchet which may then be released by hand and again engages automatically when the next filter is in proper position. Obviously, it is advisable to provide means for adjusting the frequency of the apertured disk and hence the frequency range of the amplifier, such means being well-known in the art.

Fig. 8 illustrates a cross section through the front part of an instrument according to the invention as previously described in which the rays are modulated. The casing 80 of the thermocouple is connected to a heat-accumulating head of relatively large bulk consisting of a cylindrical part 98 and a conical part 82. These two parts are rigidly secured to each other, for example, by being screwed together. The conical part 82 opening toward the front communicates, and is secured to, a second cone 84, the rear opening of which is directed toward the soldered point 78 of a bolometer 79. Interposed between the two conical parts 82 and 84 is a frame 89 forming an inner chamber 90 for receiving the filter frame 95. A disklike gate 94 indicated diagrammatically in Fig. 8 is mounted in front of a flange 81 and operates similar to a shutter in a photographic camera, while in front of such gate or shutter 94 the apertured disk 86 is rotatably mounted within the flange 81 of the frame 89, as well as within a disk 85 in such a manner that the central axis of each of the apertures 87 coincides in the respective opening position with the central axis of the instrument and hence of the conical aperture 77, 83.

The apertured disk 86 is driven by a flexible shaft 88 which passes through the rear parts of the head of the casing and is driven by a motor (not shown) which may be mounted at any suitable place. The filter frame 95, shown in Fig. 9, into the apertures 96 of which the different wave length filters may be placed is to be inserted into the opening 90. Although the frame 95 shown in Fig. 9 only admits three filters, it may be made of a length to admit any larger number. Frame 95 may also be given a disklike shape similar to the apertured disk 86 and be mounted in the same manner as that disk so that whenever such filter disk is turned the required distance, the filter disk will at the same time place another filter in front of the ray opening.

Fig. 10 illustrates a design which differs from that previously described merely by mounting the apertured disk 86 on a rigid shaft 91 which is driven through a suitable gear transmission 92 by a motor 93 mounted within the grip or handle of the casing 80. Miniature motors of this kind are commercially obtainable of a size permitting them to be easily mounted in the manner as shown. Similarly as in the embodiment shown in Fig. 8, the head of the casing 82 is protected by a cover 76, which is maintained in spaced relation therewith and consists of highly heat-insulating material such as rubber. Thus, any heat convection to the instrument caused by physical contact of its front part with the body of the person to be examined, will be completely avoided. This cover 76 also has a plurality of vents 65 permitting the heat accumulated therein to escape.

The operation of the instrument shown in Fig. 10 is as follows:

The front opening 77 of the head of the instrument is placed upon the particular place of the person to be measured. The rays radiating therefrom freely enter through the opening 77 of the outer cone 82 with the inverse conical aperture 83 and hence through the aperture in the flange 81 of the frame 89 and the conical path of the rear cone 84 toward the soldered point 78 of the temperature-responsive element 79. As illustrated in Fig. 8, the angle of the conical aperture 83 and the aperture in the disk 85 is so proportioned that a ray X entering through the opening 77 can freely pass so as to fall finally upon any point of the tapered wall of the cone 84 which is highly polished so as to reflect the incident rays toward the soldered point 78. The rays are being modulated in front of the frame 89 so that any possible radiation of the instrument itself can only be modulated together therewith by the forward cone 82 and the disk 85. The apertures of these two parts are, however, shaped so that practically all rays X never reach the temperature-responsive element but, insofar as they are still able to pass through the apertures 87 of the apertured disk 86, they strike upon the bulky conical element 84 of the heat-accumulating head and are absorbed thereby.

For carrying out the measuring process, the motor is first switched on to rotate the apertured disk 86 at a constant speed. Then, after the instrument has been placed upon the place to be measured, the shutter 94 is opened for a period sufficient for the measurement, a filter 96 then being in front of the ray opening. The shutter 94 may be operated by hand but may also run off automatically similarly to the kind used in cameras. The next filter is then placed in front of the opening and the shutter 94 again opened and closed, and so forth until a sufficient number of the desired wave lengths have been measured. The electrical variations of the bolometer 79 are then amplified in a manner known as such by an amplifier which only amplifies the modulated frequency, and finally indicated by a measuring instrument, such as a milliammeter which, however, is preferably calibrated in numeral values indicating the degrees of intensity.

Thus, according to the invention it is possible graphically to determine the intensity of the individual wave lengths throughout the entire infrared spectrum radiated by the human body and any parts thereof so as to permit important diagnostic conclusions to be drawn from the particular type and composition of the spectrum by considering the variations in intensity of the individual wave lengths, and it is the most valuable and important characteristic of the invention that such measurements may be made and such conclusions be drawn at a time when an abnormal or unhealthy organic change has not as yet occurred and when merely the tendency or inclination toward an illness exists as a result of some disturbance of the vegetative system of the human body.

While the foregoing description sets forth in detail what we regard as the preferred embodiments of our invention, it is to be understood that numerous changes may be made therein without departing from the spirit and scope of the invention as defined in the appended claims.

Having thus described our invention, what we claim as new is:

1. An apparatus for assisting in medical diagnoses, comprising a small, pistol-shaped casing having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, a shutter within said casing, means for opening and closing said shutter, said shutter consisting of heat-insulating material and when closed adapted to insulate said radiation-responsive means from being affected by the heat of said rays, and an instrument for measuring and recording the variations in intensity of said electric currents.

2. An apparatus for assisting in medical diagnoses comprising a small, pistol-shaped casing having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, said heat absorbing means comprising a tubular heat-conductive element having a plurality of inwardly directed flanges with central apertures therein and air chambers intermediate said flanges, said flanges adapted to conduct away the heat absorbed from said rays when passing through said apertures and chambers, one of said chambers substantially surrounding the front end of said radiation-responsive means, at least one of said flanges having air vents therein connecting at least said last chamber with the outer atmosphere, a shutter intermediate two of said flanges in front of said radiation-responsive means and consisting of heat insulating material, means for opening and closing said shutter, said shutter when closed adapted to insulate said radiation-responsive means from being affected by the heat of said rays, and an instrument for measuring and recording the variations in intensity of said electric currents.

3. An apparatus for assisting in medical diagnoses comprising a small, pistol-shaped casing having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, said heat absorbing means comprising a tubular heat-conducting element having a plurality of inwardly directed flanges with central apertures therein and air chambers intermediate said flanges, said flanges adapted to conduct away the heat absorbed from said rays when passing through said apertures and chambers, one of said chambers substantially surrounding the front end of said radiation-responsive means, at least one of said flanges having air vents therein connecting at least said last chamber with the outer atmosphere, a shutter intermediate two of said flanges in front of said radiation-responsive means and consisting of heat insulating material, means for opening and closing said shutter, said shutter when closed adapted to insulate said radiation-responsive means from being affected by the heat of said rays, a highly polished metal plate mounted on the front side of said shutter and having a relatively large annular surface in direct heat-conductive contact with one of said flanges when said shutter is closed for reflecting the heat of said rays toward the front and away from said radiation-responsive means and for conducting the heat accumulated thereby to said flange, said shutter only having a narrow annular rear surface in sliding contact with another one of said flanges, and an instrument for measuring and recording the variation in intensity of said electric currents.

4. An apparatus for assisting in medical diagnoses comprising a small, pistol-shaped casing of highly heat insulating material having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, a shutter within said casing, means for opening and closing said shutter, said shutter consisting of heat-insulating material and when closed adapted to insulate said radiation-responsive means from being affected by the heat of said rays, said heat-insulating casing being shaped so as to maintain said heat absorbing means substantially spaced from the path of rays therethrough, and an instrument for measuring and recording the variations in intensity of said electric current.

5. An apparatus for assisting in medical diagnoses comprising a small pistol-shaped casing of highly heat-insulating material having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, said heat absorbing means comprising a tubular heat-conductive element having a plurality of inwardly directed flanges with central apertures therein and air chambers intermediate said flanges, said flanges adapted to conduct away the heat absorbed from said rays when passing through said apertures and chambers, one of said chambers substantially surrounding the front end of said radiation-responsive means, at least one of said flanges having air vents therein connecting at least said last chamber with the outer atmosphere, a shutter intermediate two of said flanges in front of said radiation-responsive means and consisting of heat insulating material, means for opening and closing said shutter, said shutter when closed adapted to insulate said radiation-responsive means from being affected by the heat of said rays, said heat-insulating casing having air vents therein connecting said heat-conductive tubular element with the outer atmosphere, and an instrument for measuring and recording the variations in intensity of said electric current.

6. An apparatus for assisting in medical diagnoses, comprising a small, pistol-shaped casing having a muzzle adapted to admit only the infrared rays emitted by a small portion of an organic body to enter said casing when placed substantially in contact with said body, said casing containing a filter allowing only infrared rays of a relatively narrow frequency range to pass therethrough, radiation-responsive means within said casing for receiving said filtered rays and converting them into electric currents, means within at least a part of said casing for absorbing the heat of said radiation within said casing and dissipating it therefrom, said last means including passage for conducting a coolant through said casing to maintain a constant temperature therein, a shutter within said casing, means for opening and closing said shutter, said shutter consisting of heat-insulating material and when closed adapted to insulate said radiation-responsive means from being affected by the heat of said rays, and an instrument for measuring and recording the variations in intensity of said electric currents.

References Cited in the file of this patent

UNITED STATES PATENTS

| | | |
|---|---|---|
| 1,120,916 | Bitner | June 14, 1938 |
| 2,332,154 | Lindsay et al. | Oct. 19, 1943 |
| 2,562,864 | Jury et al. | July 31, 1951 |
| 2,742,578 | Nicolson et al. | Apr. 17, 1956 |